(12) United States Patent
Bailey

(10) Patent No.: US 6,544,629 B1
(45) Date of Patent: Apr. 8, 2003

(54) FOOD GRADE LAMINATE

(75) Inventor: Mark H. Bailey, Trophy Club, TX (US)

(73) Assignee: Bryan A. Netsch, Lewisville, TX (US)

( * ) Notice: Subject to any disclaimer, the term of this patent is extended or adjusted under 35 U.S.C. 154(b) by 15 days.

(21) Appl. No.: 09/865,126

(22) Filed: May 24, 2001

(51) Int. Cl.$^7$ .................................................. B32B 3/06
(52) U.S. Cl. ........................ 428/192; 428/194; 428/43; 428/202; 156/227; 156/253; 156/277
(58) Field of Search ................. 428/43, 192, 195, 428/202, 914, 194; 40/637; 156/253, 277, 227

(56) References Cited

U.S. PATENT DOCUMENTS

| | | |
|---|---|---|
| 1,071,226 A | 8/1913 | Goodsell et al. |
| 2,783,172 A | 2/1957 | Avery |
| 3,153,868 A | 10/1964 | Jones |
| 3,385,748 A | 5/1968 | Neale et al. |
| 4,044,181 A | 8/1977 | Edhlund |
| 4,104,816 A | 8/1978 | Pingeton |
| 4,174,857 A | 11/1979 | Koza |
| 4,310,978 A | 1/1982 | Stern |
| 4,552,789 A | 11/1985 | Winchell |
| 4,745,835 A | 5/1988 | Schnitzer |
| 4,797,291 A | 1/1989 | Pierce et al. |
| 4,837,956 A | 6/1989 | Delonce |
| 4,871,410 A | 10/1989 | Bonnebat et al. |
| 4,876,000 A | 10/1989 | Mikhail |
| 4,935,282 A | 6/1990 | Pawlowski et al. |
| 5,045,330 A | 9/1991 | Pawlowski |
| 5,127,743 A | 7/1992 | Miller et al. |
| 5,273,798 A | 12/1993 | Miner |
| 5,344,190 A | 9/1994 | Volz |
| 5,425,217 A | 6/1995 | Lobash et al. |
| 5,501,491 A | 3/1996 | Thompson |
| 5,618,112 A | 4/1997 | Lovell |
| 5,776,586 A | 7/1998 | Lipper |
| 5,803,261 A | 9/1998 | Nowakowski et al. |
| 5,817,385 A | 10/1998 | Stanislav |
| 5,928,741 A | 7/1999 | Andersen et al. |
| 5,962,110 A | 10/1999 | Penke-Wevelhoff |
| 5,981,011 A | 11/1999 | Overcash et al. |
| 6,035,610 A | 3/2000 | Vonderhorst et al. |
| 6,127,012 A | 10/2000 | Nagatsuna et al. |

FOREIGN PATENT DOCUMENTS

| | | |
|---|---|---|
| DE | 4102914 | 12/1991 |
| WO | WO 97/01435 | 1/1997 |

*Primary Examiner*—Alexander S. Thomas
(74) *Attorney, Agent, or Firm*—Luedeka, Neely & Graham PC

(57) ABSTRACT

The invention provides a food grade laminate for insertion into a food container. The food grade laminate includes a laminate structure having at least one removable edge portion and facing cellulosic webs. Each of the webs have first and second surfaces, a first web edge portion disposed adjacent the removable edge portion, opposing end edge portions and a second edge portion opposite the first edge portion. A substantially oil and grease impermeable food contact layer is laminated on the first surface of the webs. Indicia is printed on the second surface of at least one of the webs. The second surface of the webs along the first edge portion and the opposing end edge portions are substantially adhesively attached to one another to provide the laminate structure. Perforations are provided between adjacent laminate structures on an elongate roll of laminate structures to enable separation between adjacent laminate structures with a separation force ranging from about 6 to about 16 pounds per lineal inch of the perforations.

12 Claims, 5 Drawing Sheets

FOOD GRADE LAMINATE

FIELD OF THE INVENTION

The invention relates to a food package insert and more particularly to a laminated insert for food packages and methods for making the inserts.

BACKGROUND

Inserts for food packages have been used for a number of years for promotional and entertainment purposes, e.g. game pieces, prizes, coupons and the like. In order to protect food in the packages from contamination from the inserts, the inserts are typically sealed in an impervious film envelope, e.g., the inserts are over-wrapped with a protective barrier film. The barrier film not only protects the food from contamination but also reduces the absorption of oil, grease and/or moisture from the food which can soil or damage a printed insert. However, over-wrapping the insert is a secondary, independent process that is conducted after printing the insert. Accordingly, over-wrapping adds costs and time to provide a finished over-wrapped insert product.

Because of the over-wrapping, the insert must be smaller so that the overall over-wrapped insert meets particular size criteria. In some cases, the over-wrapping is damaged or not properly sealed thereby leading to damage of the insert. Another problem with over-wrapped inserts is that the over-wrapping may pose a choking hazard for small children. The plastic over-wrap is typically not water soluble and if ingested by a child may cause injury or death. Over-wrapping therefore not only substantially increases the cost of the insert, it provides a health risk for use on inserts in food packages.

Accordingly, there is a need for inserts for food packages which are safe for children and which can be produced in high volume with a substantially lower cost than with over-wrapping constructions. There is also a need for a method for producing inserts for food packages which will not contaminate the food and are not soiled by oils or grease in the food when the food is in contact with the insert.

SUMMARY OF THE INVENTION

With regard to the foregoing and other objects and advantages, the invention provides a food grade laminate for insertion into a food container. The food grade laminate includes a laminate structure having at least one removable edge portion and facing cellulosic webs, the cellulosic webs being substantially oil and grease proof. Each of the webs have first and second surfaces, a first web edge portion disposed adjacent the removable edge portion, opposing end edge portions and a second edge portion opposite the first edge portion. A substantially oil and grease impermeable food contact layer is laminated on the first surface of the webs. Indicia is printed on the second surface of at least one of the webs. The second surface of the webs along the first edge portion and the opposing end edge portions are substantially adhesively attached to one another to provide the laminate structure. Perforations are provided between adjacent laminate structures on an elongate roll of laminate structures to enable separation between adjacent laminate structures with a separation force ranging from about 6 to about 16 pounds per lineal inch of the perforations.

In another aspect, the invention provides a method for making a food safe food package. The method includes providing first and second cellulosic web portions made of a cellulosic material which is substantially oil and grease proof, each of the web portions having first and second surfaces, first and second edge portions and first and second end portions, wherein the first edge portions are first removable edge portions. An image is printed on at least the second surface of at least one of the cellulosic web portions. A substantially oil and grease impermeable material is laminated to the first surface of the cellulosic web portions. The first edge portions and the first and second end portions of the second surface of the web portions are adhesively attached to one another to provide a laminate structure. The laminate structure is intermittently perforated with castle-shaped perforations to provide a plurality of removably attached inserts in an elongate web, wherein the perforations have a burst strength ranging from about 6 to about 16 pounds per lineal inch of the perforations.

An important advantage of the food package insert of the invention is that the laminate cellulosic web structure is substantially oil and grease impermeable thereby eliminating the need for over-wrapping or placing the insert in an impervious envelope despite the use of a cellulosic web as a major component of the insert. The particular construction features of the laminate structure also enable a plurality of inserts to be made from an elongate cellulosic web and detached from the elongate web using an automated process to place the inserts in food containers. Another advantage of the invention is that the entire process for making the elongate webs may be provided by a continuous printing and laminating unit which may be placed closely adjacent to a food packaging machine for direct insert into food packages. In the alternative the elongate web may be rolled, stored or transported to a food packaging site for substantially continuous automatic insertion into a food package or container.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein.

DETAILED DESCRIPTION OF THE PREFERRED EMBODIMENTS

Figure 1:
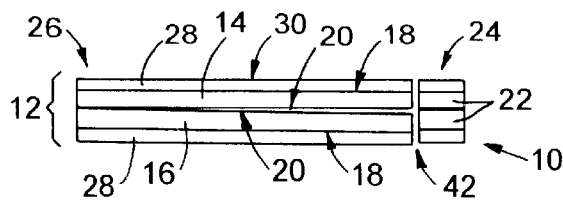
FIG. 1 is an elevational view, not to scale, of a food grade laminate according to the invention.
Figure 2:
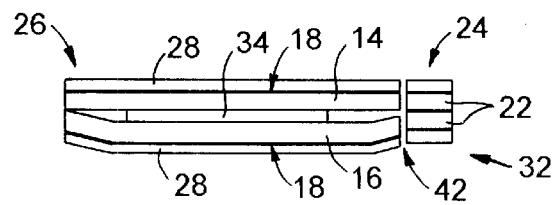
FIG. 2 is an elevational view, not to scale, of another food grade laminate according to the invention.

With reference to FIG. 1, a food grade laminate insert 10 according to the invention is provided by a laminated structure 12 including first and second cellulosic web portions 14 and 16. For the purposes of this invention, the term "web portions" means distinct portions of a single web or two distinctly separate webs. Each web portion 14 and 16 is preferably made of an oil and grease resistant cellulosic web and has a first surface 18 and a second surface 20. A first web edge portion 22 of the first and second web portions 14 and 16 is disposed in at least one removable edge portion 24 and second web edge portion 26 is disposed opposite the removable edge portion 24. The second web edge portion 26 may be a fixed edge portion or a removable edge portion. The first and second cellulosic web portions 14 and 16 are preferably provided by a relatively heavy weight paper or paperboard material which is treated so as to be substantially oil and grease resistant and is approved for direct food contact. For the purposes described herein, the web portions 14 and 16 cannot be treated with chemicals which are leachable from the webs and are harmful if ingested. A particularly preferred material for web portions 14 and 16 is a 70 pound per ream oil and grease proof cellulosic web made by Crown Vantage Inc. of Cincinnati, Ohio which exhibits little or no oil or grease wicking characteristics.

The oil and grease resistance of the web portions 14 and 16 may be provided by incorporating suitable chemicals in the webs during manufacture of the cellulosic web used to provide web portions 14 and 16. In order to provide a substantially oil and grease resistant insert for food packages which contain oily or greasy foods, the first surface 18 of the cellulosic web portions 14 and 16 are preferably laminated with a polymeric material 28 which is substantially oil and grease impermeable. The polymeric material 28 is preferably applied to the first surface 18 of the web portions 14 and 16 in a substantially continuous printing, laminating or coating operation. A preferred polymeric material is polyolefin-based polymeric material selected from the group consisting of polypropylene, polystyrene, polyethylene and the like and is applied with a thickness ranging from about 1 mil to about 3 mils.

The first surface 18 of the web portions 14 and 16 may be printed with indicia before applying the polymeric material to the webs thereby further protecting food products from inks used to print indicia on the first surface 18 of the web portions 14 and 16. In the alternative the outer surface 30 of the polymeric material may printed with non-toxic inks suitable for direct food contact. The non-toxic inks are preferably water soluble inks which exhibit excellent adhesion and abrasion resistance when applied to cellulosic webs and to medium, low or high density treated polyethylene, polypropylene, cellophane, foils and the like. Such inks are available from Colorcon, Inc. of West Point, Pa. under the trade name NT-23.

The second surface 20 of the first and second web portions 14 and 16 are preferably printed with inks which are suitable for indirect food contact. Such inks are also preferably non-toxic inks which are sanctioned by the Food & Drug Administration (FDA) and the United States Department of Agriculture (USDA) as acceptable for minimal food contact applications. The inks are water-based and comply with Environmental Protection Agency (EPA) regulations. Such inks may be applied to the surfaces 20 and/or 30 by flexographic and gravure printers and are available from Colorcon, Inc. under the trade name FLEXICRAFT.

Figure 3:
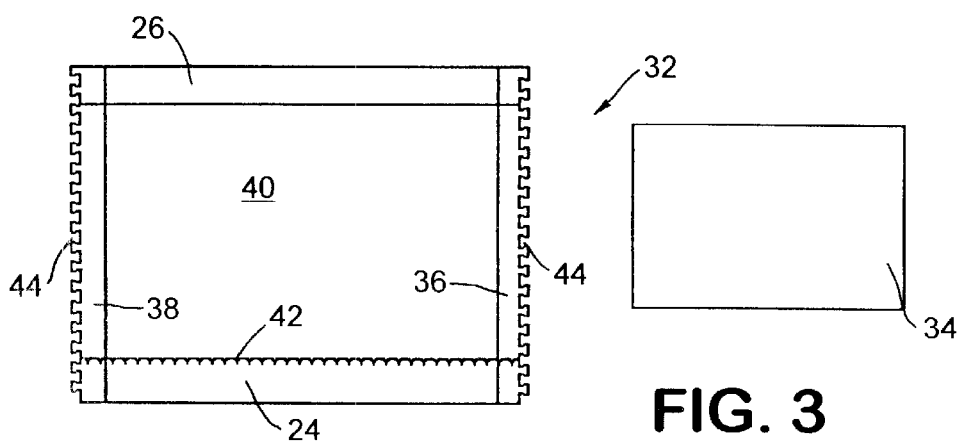
FIG. 3 is a plan view of a food grade laminate and insert object according to the invention.
Figure 4:
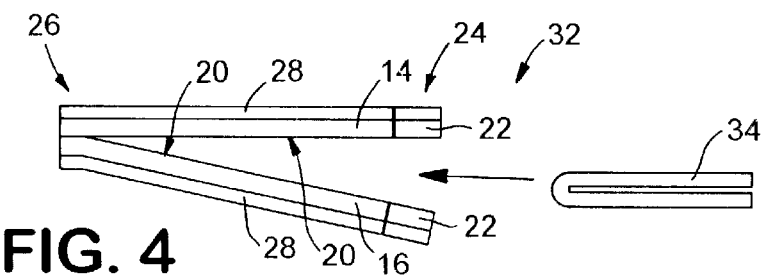
FIG. 4 is an elevational view of a process for seeding one or more food grade laminates with an object according to the invention.
Figure 5:
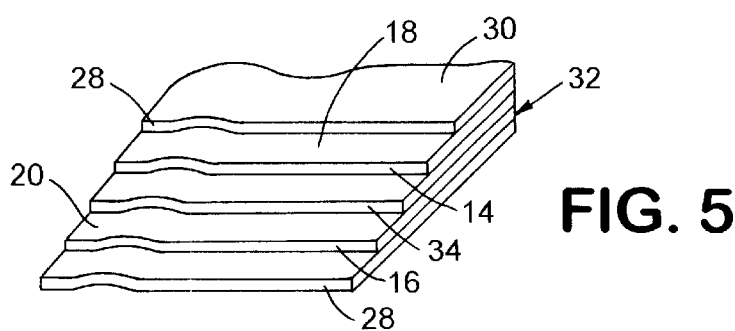
FIG. 5 is a perspective view of a food grade laminate according to the invention.

An alternative food grade laminate insert 32 is illustrated in FIGS. 2–5. In this embodiment, the laminate insert 32 includes the first and second cellulosic web portions 14 and 16 and polymeric material 28 laminated to the first surface 18 of the web portions 14 and 16 as set forth above with respect to FIG. 1. An object 34 such as currency, a coin, a coupon or other relatively thin material is intermittently inserted or "seeded" into the laminate insert 32 between the first and second web portions 14 and 16 as the webs are attached to one another along the first web edge portion 22 and the end edge portions 36 and 38 (FIG. 3).

The adhesive used to attach the second surface 20 of web portions 14 and 16 to each other in face to face opposing contact along the first web edge portion 22 and the first and second end portions, such as end portions 36 and 38 is preferably a low odor adhesive suitable for indirect food contact. Such adhesives are preferably aqueous adhesives based upon ethylene/vinyl acetate emulsions, polyvinyl alcohols, acrylic and polyurethane dispersions and emulsions available from Croda Adhesives, Inc. of Itasca, Ill. under the trade name CRODAFIX 57–174. The adhesive is preferably applied to the second surface 20 of the cellulosic webs 14 and 16 and only in the edge portions 22 and/or 26 and end portions 36 and 38 of the laminate insert 10 or 32. It is important to provide a suitable adhesive on edge portions 22 and 26 and end portions 36 and 38 so that the flow of grease, oil and the like from the food between the first and second web portions 14 and 16 is minimized. Accordingly, the edge portions 22 and 26 and end portions 36 and 38 are preferably sealed by applying CRODA glue available from Croda Adhesives to surfaces 20 of the edge portions 22 and 26 and end portions 36 and 38. The CRODA glue adhesive is applied to the edge portions 22 and 26 and end portions 36 and 38 with a thickness ranging from about 0.03 to about 1.5 mils and is applied with a width ranging from about 1/32 to about 1/8 of an inch. It is preferred that the adhesive be applied no closer than about 1/64 to about 1/4 inch from the edges and perforations of the webs.

The removable edge portion 24 is preferably separable from a main portion 40 of the laminate insert 10 or 32 by a perforated seam 42. Any perforations suitable for aiding separation of the edge portion 24 from the main portion 40 may be used. It will be recognized that a perforated seam such as seam 42 may also be used for second edge portion 26 in the instance where second edge portion 26 is also a removable edge portion rather than a fixed edge portion. However, the number of perforations in the laminated structure 12 between the edge or end portions and interior of the laminated structure 12 containing printed surfaces 20 is preferably minimized to reduce wicking of oil and grease toward surfaces 20 of the structure 12.

A particularly important feature of the invention are perforations 44 on the opposing end portions 36 and 38. Perforations 44 are disposed in an elongate web containing multiple laminate inserts 10 or 32 to provide individual inserts 10 or 32 separable from the elongate web for insertion into food packages. The perforations 44 must be sufficient to hold individual inserts together in an elongate web of laminate inserts 10 or 32, yet the inserts 10 or 32 must be readily separable from one another for automatic machine placement of the inserts 10 or 32 in a food package. Accordingly, the burst strength or tensile strength of the perforations is preferably in the range of from about 6 to about 16 pounds per lineal inch of perforations 44 on opposing end portions 36 and 38.

The burst strength of a line of perforations is generally determined by the ratio of cut and tie of a perforation in the line of perforations, by the sharpness of the perforating blade or wheel, the pressure of the perforator, and the paper quality. A particularly preferred perforation 44 is known as a castle perf. The cut of the perforating blade for such a castle perf preferably ranges from about 0.05 to about 0.09 inches and the tie of the castle perf preferably ranges from about 0.04 to about 0.08 inches. A particularly preferred castle perf has a cut of 0.0781 inches and a tie of 0.0625 inches. To meet the desired burst strength based on the tensile strength of the substrate, a shim is added between the perf blades. The shim preferably has a thickness ranging from about 0.001 to about 0.002 inches.

Figure 7:
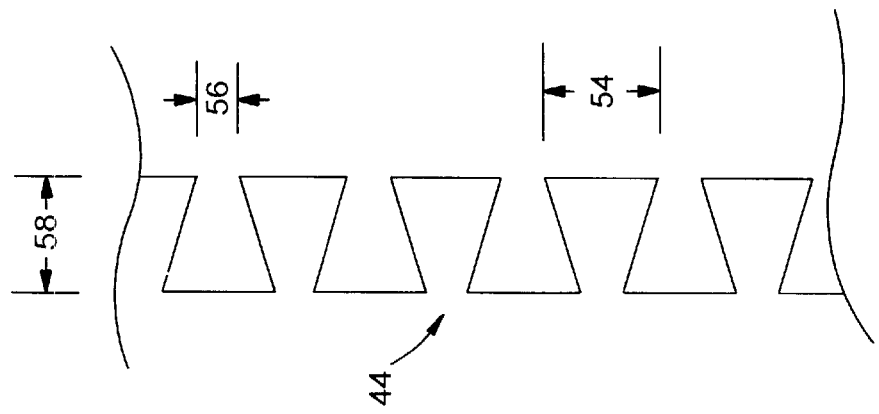
FIG. 7 is a partial enlarged view of castle perforations according to the invention.
Figure 6:
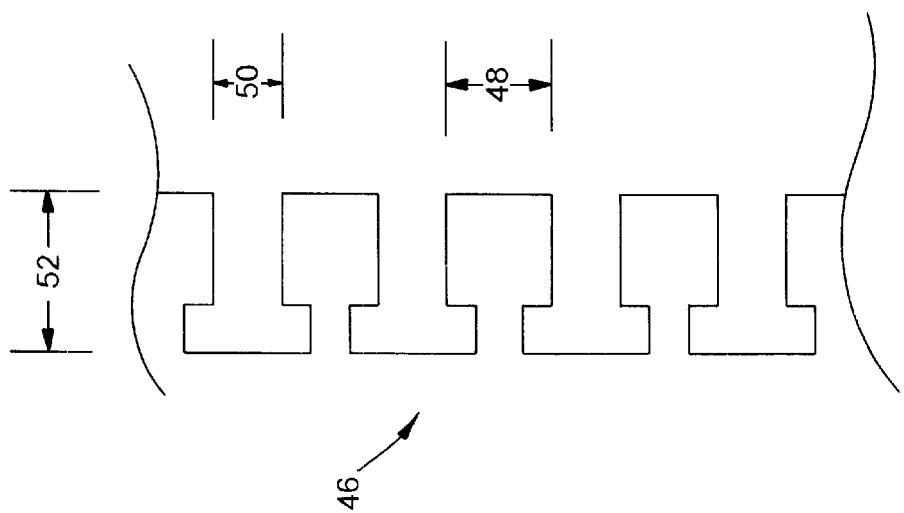
FIG. 6 is a partial enlarged view of conventional castle perforations.

A conventional castle perf 46 is shown in FIG. 6 and a castle perf 44 according to the invention is shown in FIG. 7. In a conventional castle perf 46, the cut 48 preferably ranges from about 0.03 to about 0.04 inches and the tie 50 preferably ranges from about 0.06 to about 0.08 inches. The depth 52 of the cut preferably ranges from about 0.05 to about 0.07 inches. In the perforations 44 according to the invention, the cut 54 preferably ranges from about 0.04 to about 0.06 inches, the tie 56 preferably ranges from about 0.02 to about 0.04 inches and the depth 58 of the cut 54 preferably ranges from about 0.04 to about 0.06 inches.

Figure 8:
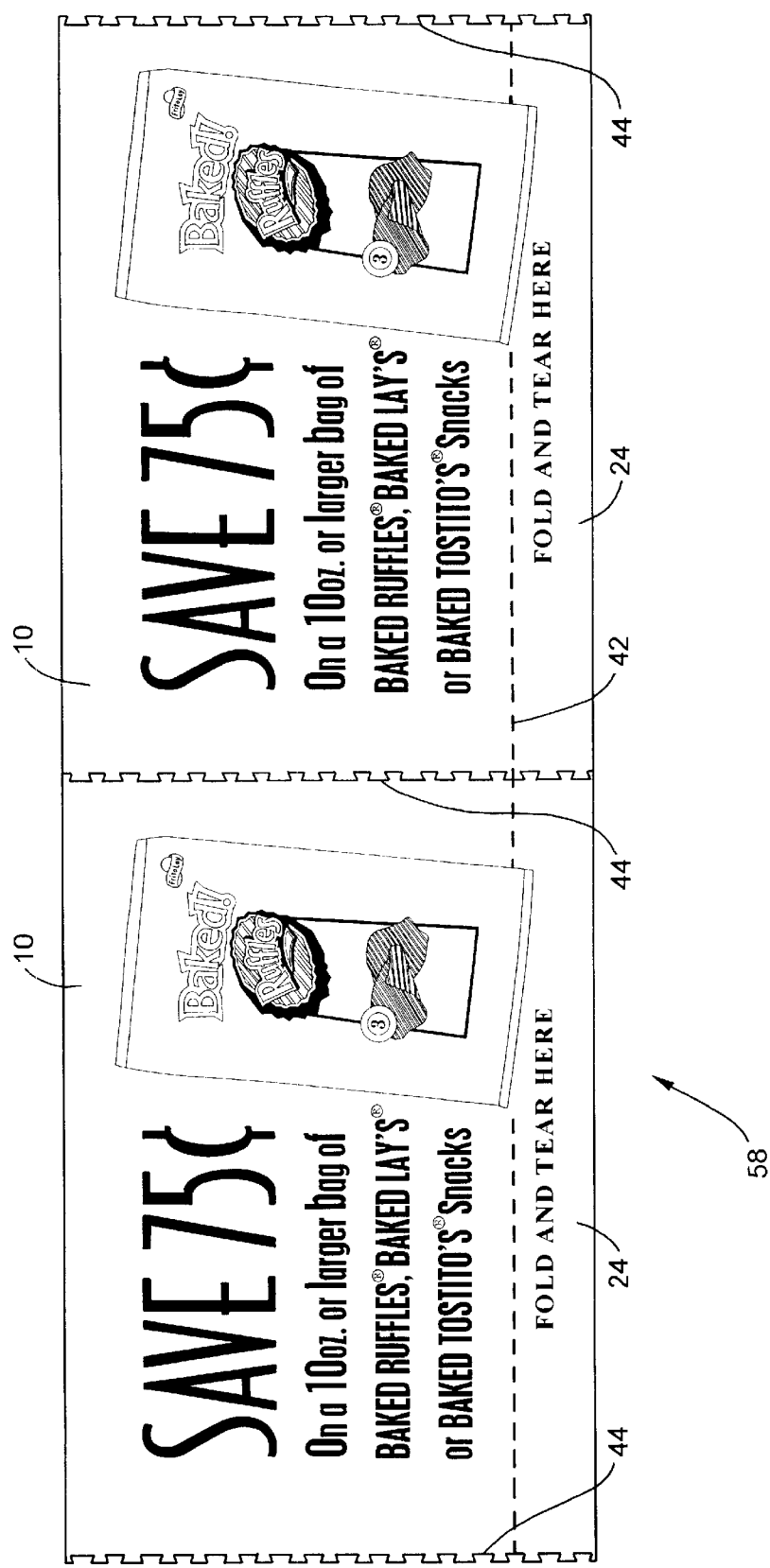
FIG. 8 is a plan view of a continuous web of food grade laminates made according to the invention.
Figure 9:
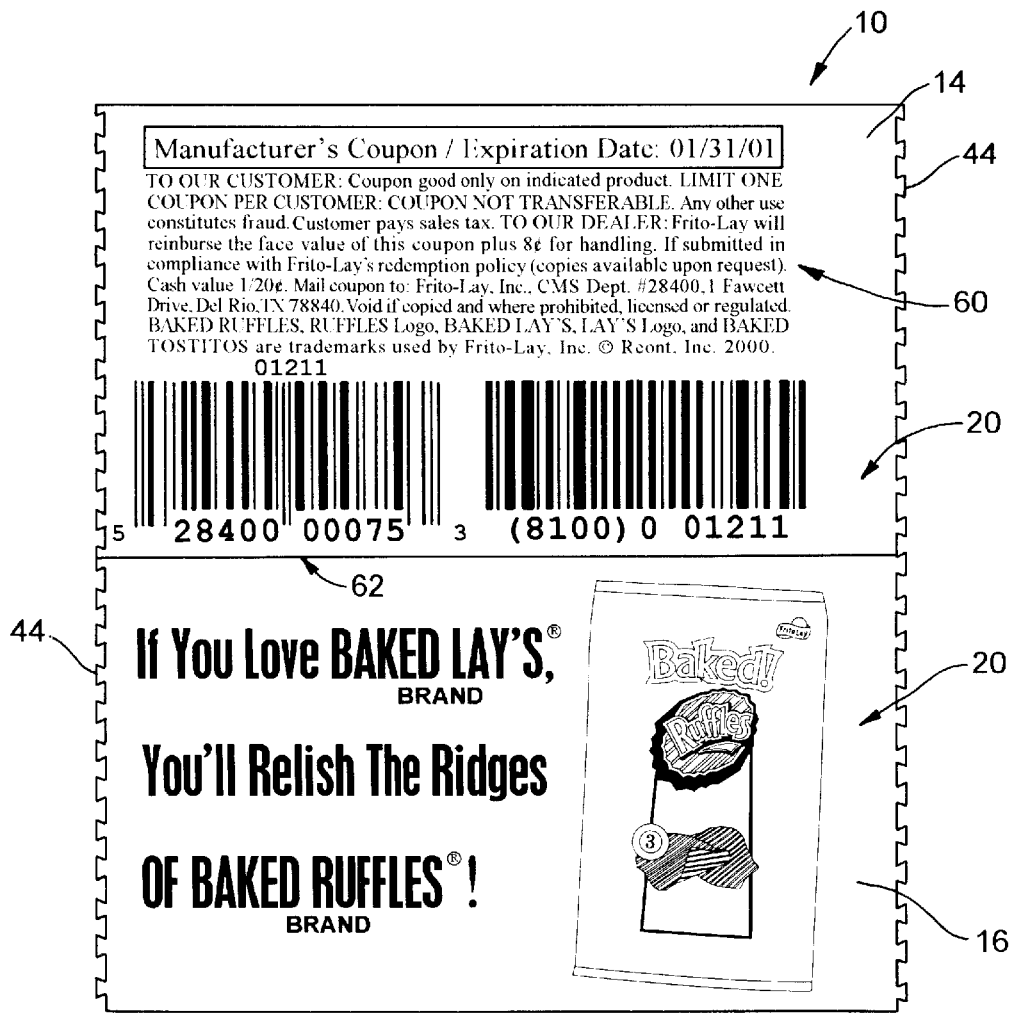
FIG. 9 is a plan view of an inside surface of a printed food grade laminate made according to the invention.

With reference to FIGS. 8 and 9, other features of the laminate inserts 10 or 32 will now be described. FIG. 6 is a portion of an elongate web 58 containing laminate inserts 10 removably attached to one another. The perforations 44 provide removable attachment between adjacent laminate inserts 10. Each of the inserts 10 contains a first removable edge portion 24 that is removable from the remainder of the inserts 10 along perforated seam 42. Upon removal of removable edge portion 24, the insert 48 may be opened to expose printed indicia 60 on the second surface 20 of the laminate inserts 10. In the embodiment illustrated in FIGS. 8 and 9, the second web edge portion 26 (FIG. 1) is fixedly attached to the laminate insert 10 so that it is non-removable therefrom. Accordingly, laminate insert 10 is provided with a hinge 62 disposed between the first cellulosic web portion 14 and the second cellulosic web portion 16. Regardless of whether a hinge portion 62 is provided or a second removable edge portion is provided, the cellulosic web providing the first and second cellulosic web portions 14 and 16 may be made from a single cellulosic web or two separate cellulosic webs. Accordingly, folding a single cellulosic web along hinge 62 protects the second surface 20 from exposure to food while the first surface 18 is exposed to food.

Figure 10:
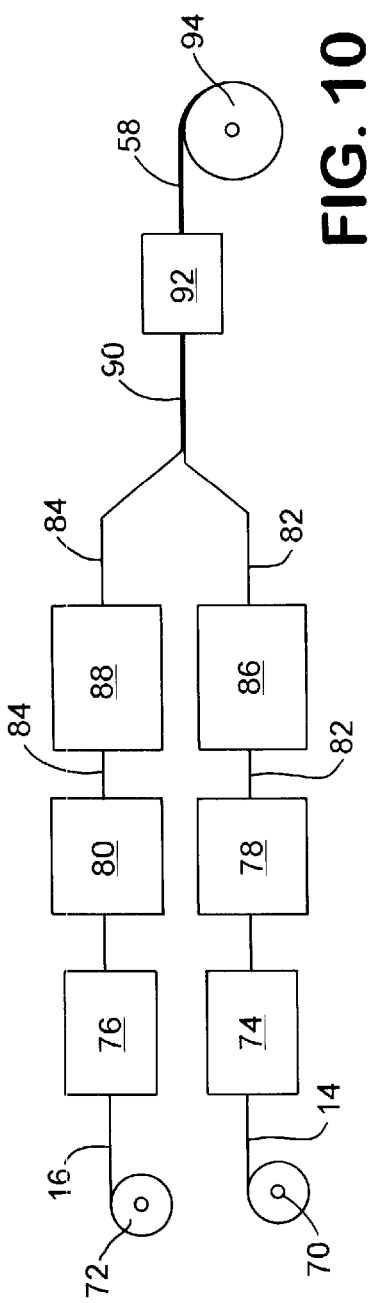
FIGS. 10 and 11 are schematic illustrations of processes for making food grade laminates according to the invention.
Figure 11:
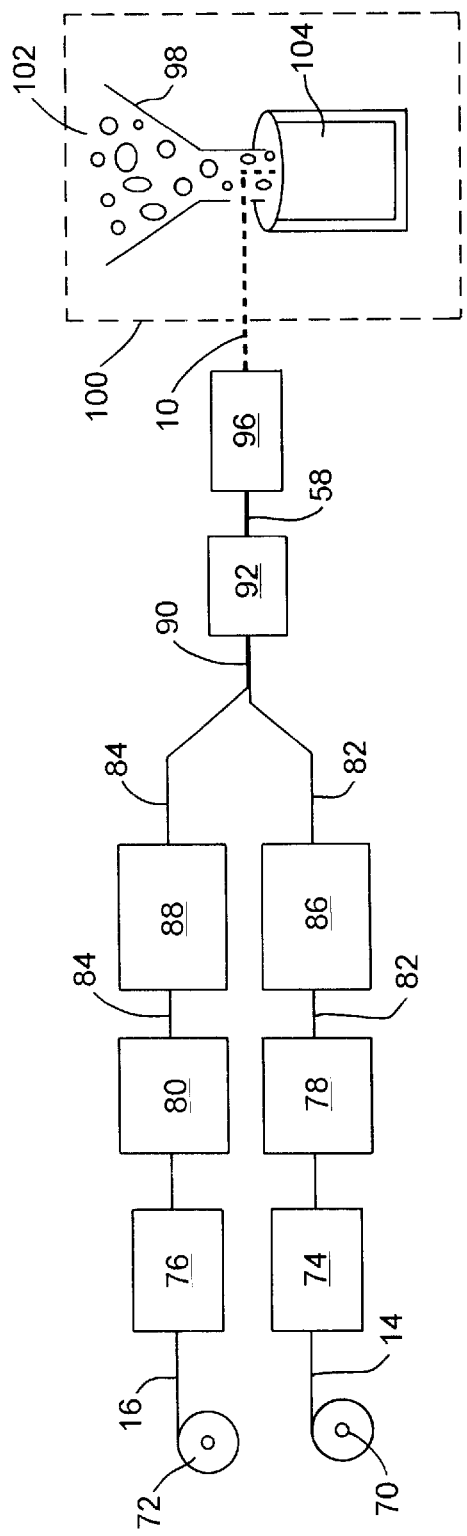

With reference to FIGS. 10 and 11, methods for making the food grade inserts 10 or 32 and methods for placing the inserts 10 or 32 in food packages will now be described. The laminate structure 12 is preferably formed from two individual elongate cellulosic webs fed from feed rolls 70 and 72. Roll 70 provides the first cellulosic web portion 14 and roll 72 provides the second cellulosic web portion 16. Each of the web portions 14 and 16 are processed through multiple printing units represented by rectangles 74 and 76. The printing units 74 and 76, for example, may include from one to sixteen units to apply black, cyan, magenta, yellow and/or opaque white inks to each side of the webs. The printing units represented by rectangle 74 provide printing to the first and second surfaces 18 and 20 of the first web portion 14. The printing units represented by rectangle 76 provide printing to the first and second surfaces 18 and 20 of second web portion 16.

Prior to attaching web portions 14 and 16 to one another, the webs are passed through laminating units represented by rectangles 78 and 80 wherein a substantially impermeable polymeric material 28 is applied to the first surface 18 of web portions 14 and 16 to provide a laminate structure 12. The polymeric material may be applied to the first surface 18 of the web portions 14 and 16 by a variety of methods including roll coating, extrusion, printing, spray coating and the like. Preferably the polymeric material is applied to the first surface of the web portions 14 and 16 by laminating the polymeric material to the first surface of the web portions 14 and 16. The amount of polymeric material applied to the first surface 18 of the web portions 14 and 16 preferably ranges from about 1 mil to about 3 mils providing a polymeric layer thickness ranging from about 1 mil to about 3 mils.

After applying the polymeric material 28 to web portions 14 and 16, the polymer coated webs 82 and 84 are passed through adhesive units 86 and 88 which may be one or two printing units which selectively apply adhesives to the second surface 20 of webs 82 and 84 in the removable edge portion 24 and the second edge portion 26 and end edge portions 36 and 38 (FIG. 3). It is preferred that the adhesive be applied only in the edge portions so that when the second surface 20 of the webs 82 and 84 are separated from one another to provide open insert 10 as shown in FIG. 7, the indicia 60 on the second surfaces 20 of the webs 82 and 84 is not disturbed. Once the adhesive is selectively applied to the web edge and end portions 24, 26, 36 and 38 respectively, the webs 82 and 84 are adhesively attached to one another to provide an elongate composite web 90.

After the composite web 90 is formed, the composite web 90 is perforated in a perfing unit 92 to provide individualized inserts which may be removed from the elongate composite web 46. The perforated web 46 may then be rolled on a transfer roll 94 for transportation to a food packaging plant (FIG. 9). In the alternative, a perforated web 46 may be fed directly to an in-pack machine 96 which separates individual inserts 10 or 32 from the web 46 and disposes the inserts 10 in a former funnel 98 of a food package filling machine 100. Since the package filling machine 100 and the printing units 74 and 76, laminating units 78 and 80, adhesive units 86 and 88 and perfing unit 92 do not typically run at the same speed as the package filling machine 100, multiple package filling machines 100 may be provided in line with the manufacture of the perforated web 46.

In the food packaging machine 100, the insert 10 is combined with food 102 as food packages 104 are being filled on a continuous basis. Accordingly, the insert 10 of the invention is adaptable to a continuous operation which provides inserts from an elongate roll 94 formed in a separate operation or in a separate location and inserts 10 formed directly from the printing and perfing machines in the same location as the food packaging machine 100. Elimination of the over-wrapping step also provides an improved food package insert as described above thereby reducing operating and equipment costs for providing such inserts 10.

The before-described process is suitable to overcome difficulties associated with effectively sealing the cellulosic web portions 14 and 16 and the printed indicia 50 from contact with oil or grease in the food product. Oil and grease tends to wick through exposed or uncoated edge portions of the laminate structure.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A food grade laminate for insertion into a food container, comprising a laminate structure having at least one removable edge portion, the laminate structure including facing cellulosic webs, the cellulosic webs being substantially oil and grease proof and each of the webs having first and second surfaces, a first web edge portion disposed adjacent the removable edge portion, opposing end edge portions, a second edge portion opposite the first edge portion, a substantially oil and grease impermeable food contact layer laminated on the first surface of the webs and indicia printed on the second surface of at least one of the webs, wherein the second surface of the webs along the first edge portion and the opposing end edge portions are substantially adhesively attached to one another to provide the laminate structure and wherein perforations between adjacent laminate structures on an elongate roll of laminate structures enable separation between adjacent laminate structures with a separation force ranging from about 6 to about 16 pounds per lineal inch of the perforations.

2. The food grade laminate of claim 1 wherein the perforations comprise castle-shaped perforations.

3. The food grade laminate of claim 1 wherein a cut length of the perforations ranges from about 0.05 to about 0.09 inches and a tie length of the perforations ranges from about 0.04 to about 0.08 inches.

4. The food grade laminate of claim 1 wherein the substantially oil and grease impermeable layer comprises a thermoplastic material selected from the group consisting of polyethylene, polypropylene, and polystyrene.

5. A method for making a food safe food package comprising:

providing first and second cellulosic web portions made of a cellulosic material which is substantially oil and grease proof, each of the web portions having first and second surfaces, first and second edge portions and first and second end portions, wherein the first edge portions are first removable edge portions;

printing an image on at least the second surface of at least one of the cellulosic web portions;

laminating a substantially oil and grease impermeable material to the first surface of the cellulosic web portions;

adhesively attaching the first edge portions and the first and second end portions of the second surface of the web portions to one another to provide a laminate structure; and intermittently perforating the laminate structure with castle-shaped perforations to provide a plurality of removably attached inserts in an elongate web, wherein the perforations have a burst strength ranging from about 6 to about 16 pounds per lineal inch of the perforations.

6. The method of claim 5 further comprising detaching the food package inserts from the elongate web to provide the food package insert.

7. The method of claim 5 further comprising providing a fixed edge portions opposite the removable edge portions.

8. The method of claim 5 further comprising intermittently seeding the laminate structures with an object disposed between the second surfaces of the first and second web portions.

9. The method of claim 5 wherein the first and second web portions are provided by folding a cellulosic web so that the second surfaces of the web portions face each other.

10. A method for making an elongate cellulosic laminate structure containing printed images thereon comprising:

providing first and second web portions made of a substantially oil and grease proof cellulosic material, each of the web portions having first and second surfaces and including first and second edge portions and first and second end portions;

feeding the web portions through one or more printing units to provide printed images on at least a second surface of one of the web portions;

applying a substantially oil and grease impermeable polymeric material to the first surface of the web portions;

applying a food grade adhesive to the first edge portions and the first and second end portions of the first web;

adhesively attaching the first edge portions and the first and second end portions of the second surface of the first web portion to the second surface of the second web portion to provide the elongate laminate structure having an outer substantially oil and grease impermeable surface; and perfing the elongate laminate structure intermittently in a die unit to provide a plurality of individualized inserts having perforations on the first and second ends thereof, wherein the perforations have a burst strength ranging from about 6 to about 16 pounds per lineal inch of the perforations.

11. The method of claim 10 wherein the perforations comprise castle-shaped perforations.

12. The method of claim 10 wherein the first and second web portions are provided by folding a cellulosic web so that the second surfaces of the web portions face each other.

* * * * *